United States Patent
Ho (10) Patent No.: US 8,195,932 B2
(45) Date of Patent: Jun. 5, 2012

(54) AUTHENTICATION AND ENCRYPTION FOR SECURE DATA TRANSMISSION

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 12/697,086

(22) Filed: Jan. 29, 2010

(65) Prior Publication Data

US 2010/0199091 A1    Aug. 5, 2010

Related U.S. Application Data

(60) Provisional application No. 61/148,629, filed on Jan. 30, 2009.

(51) Int. Cl.
    *H04L 9/00* (2006.01)
(52) U.S. Cl. .......................... 713/150; 713/168; 713/181
(58) Field of Classification Search .................. 713/168, 713/181
    See application file for complete search history.

(56) References Cited

U.S. PATENT DOCUMENTS

| | | | | |
|---|---|---|---|---|
| 6,061,449 A * | 5/2000 | Candelore et al. | ............... | 380/28 |
| 6,128,737 A * | 10/2000 | Jakubowski et al. | .......... | 713/181 |
| 7,715,553 B2 * | 5/2010 | Smith et al. | ..................... | 380/29 |

OTHER PUBLICATIONS

Davenport, MedWiN MAC and Security Proposal—Documentation, IEEE P802.15, May 4, 2009.

* cited by examiner

*Primary Examiner* — Ponnoreay Pich
(74) *Attorney, Agent, or Firm* — Steven A. Shaw; W. James Brady; Frederick J. Telecky, Jr.

(57) ABSTRACT

A system and method for authenticating and encrypting messages for secure transmission is disclosed. A frame to be transmitted between devices comprises a frame header and a frame body. The frame body includes a security sequence number (SSN), frame payload, and message integrity code (MIC). The SSN is incremented by one for each frame transmitted using a same pairwise temporal key (PTK). A nonce is formed using the frame header and the SSN. Counter blocks $Ctr_i$ and a first input block $B_0$ are created using the nonce. Payload blocks $B_i$ are created from the frame payload. The frame payload encrypted by sequentially applying the blocks of payload data $B_i$ and corresponding counter blocks $Ctr_i$ to a cipher function. The MIC is computed by cipher block chaining a cipher function applied to blocks $B_0$ and $B_i$, and counter block $Ctr_0$. The cipher functions all use the PTK.

33 Claims, 5 Drawing Sheets

AUTHENTICATION AND ENCRYPTION FOR SECURE DATA TRANSMISSION

CROSS-REFERENCE TO RELATED APPLICATIONS

The present application claims the benefit of the filing date of U.S. Provisional Patent Application No. 61/148,629, which is titled "Authentication and Encryption for Secure Data Transmission" and filed Jan. 30, 2009, the disclosure of which is hereby incorporated by reference herein in its entirety.

TECHNICAL FIELD

Embodiments of the invention are directed, in general, to data security and, more specifically, to encrypting and authenticating data messages and to defending against message replays.

BACKGROUND

Messages exchanged between two or more parties in a wireless network or over the Internet are vulnerable to eavesdropping and manipulation by other parties. Security is required to protect the confidentiality and integrity of the message exchanges. Typically, messages are protected through encrypting and authenticating the messages with a pairwise temporal key (PTK) or session key that is shared between the intended parties.

However, even if a malicious third party cannot decrypt an encrypted message or forge an authenticated message because it does not have the PTK, the third party can cause other problems during a communication session between a sender and intended recipient. By capturing encrypted and/or authenticated messages and resending them one or more additional times to the intended recipient (i.e. replaying the messages), a malicious third party may cause the intended recipient to act on the same single message multiple times. Such a message replay attack may result in a dangerous condition depending upon the actions that are triggered in the intended recipient by the replayed message. For example, if the intended recipient takes a medical action in response to an original message, the replayed message(s) would result in taking excessive actions, such as causing the recipient to over-dispense medication.

SUMMARY OF THE INVENTION

Embodiments of the present invention provide a system and method for encrypting and authenticating messages in medium access control sublayer frames that are exchanged between devices. The messages are encrypted and authenticated using a shared key known to both devices. Other embodiments of the present invention further provide measures to detect and filter replayed messages.

Embodiments of the invention provide security protection using confidentiality, authenticity and integrity, and anti-replay measures. Three levels of protection are provided, including no authentication or encryption (i.e. unsecured communication), authentication but no encryption, and both authentication and encryption. Messages with authentication but no encryption are transmitted in secured authenticated but not encrypted frames. This provides measures for message authenticity and integrity validation and replay defense but does not provide confidentiality or privacy protection. Messages with authentication and encryption are transmitted in secured authenticated and encrypted frames, which provide measures for message authenticity and integrity validation, confidentiality and privacy protection, and replay defense.

A system and method for authenticating and encrypting messages for secure transmission between devices is disclosed. In one embodiment, a frame is to be transmitted from a first device to a second device. The frame comprises a frame header, a frame body and a frame check sequence. The frame header includes sender and recipient address information and frame control data. The frame body includes a security sequence number (SSN), a frame payload and a message integrity code (MIC). The SSN is based upon the number of prior messages transmitted using a particular pairwise temporal key (PTK) shared by the devices. The SSN is incremented by one for each message frame transmitted using the same PTK.

The frame payload may be encrypted or unencrypted. In one embodiment, the encrypted frame payload and MIC are computed using an advanced encryption standard (AES).

A nonce is formed using the frame header and the SSN from the frame payload. A series of m counter blocks $Ctr_i$ are created, where $i=0, 1, \ldots, m$. The counter blocks comprise the nonce, which was formed using the frame information, and a counter corresponding to the value of i. An initial input block $B_0$ for a cipher block chaining operation is created. The content of the initial input block $B_0$ varies depending upon whether the frame payload is encrypted or unencrypted. The initial input block $B_0$ comprise a flag indicating whether the frame payload is encrypted or not, the nonce described above, and a frame payload length value. The frame payload value is set to 0 when the payload is unencrypted. A series of payload blocks $B_i$ are also created, where $i=0, 1, \ldots, m$. In one embodiment, the payload blocks are 16-octet sections of the payload. The last 16-octet section is zero padded as needed based upon the length of the original frame payload.

The frame payload may be secured by sequentially applying the blocks of payload data $B_i$ and corresponding counter blocks $Ctr_i$ to the cipher function one block at a time, wherein the cipher function uses the PTK. The MIC is computed by cipher block chaining a cipher function applied to initial input block $B_0$, the blocks of payload data $B_i$ ($i=1, \ldots, m$), and an initial counter block $Ctr_0$, where the cipher function uses the PTK. The MIC is formed from the group of the leftmost octets, such as the four leftmost octets, in the output of the cipher block chaining operation.

A frame containing a received message may be authenticated using the MIC and replay detected further using the SSN. The received frame comprises a header, a first security sequence number (SSN), a frame payload, a first message integrity code (MIC), and other fields. A second MIC is calculated from selected bits in an output produced by cipher block chaining a cipher function applied to blocks constructed from a decryption the frame. The cipher function uses the shared PTK. The system and method verifies that the first MIC matches the second MIC to ensure the authenticity and integrity of the received message. The received message is accepted and the associated SSN is recorded only if the first MIC and the second MIC match. Further, the first SSN is compared to a last recorded SSN. A replayed message is identified and discarded by determining that the first SSN is smaller than or equal to the last recorded SSN. The source of the received message is corroborated by determining that the first MIC matches the second MIC and that the first SSN is not smaller than the last recorded SSN.

BRIEF DESCRIPTION OF THE DRAWINGS

Having thus described the invention in general terms, reference will now be made to the accompanying drawings, wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment of the invention, two devices establish a communication session and exchange data messages in authenticated frames that may or may not be encrypted. The messages also include provisions for defending against replay using a security sequence number (SSN) and message integrity code (MIC). In the exemplary system and method disclosed herein, the frames are authenticated and encrypted/decrypted based on a counter mode encryption and cipher block chaining for message integrity protection (CCM) as specified in the National Institute of Standards and Technology (NIST) Special Publication 800-38C, with the Advanced Encryption Standard (AES) forward cipher function for 128-bit keys as specified in Federal Information Processing Standard (FIPS) publication Pub 197 applied as the underlying block cipher algorithm. A shared pairwise temporal key (PTK) is used as a session key for securing frames transmitted between the device.

Figure 1A:
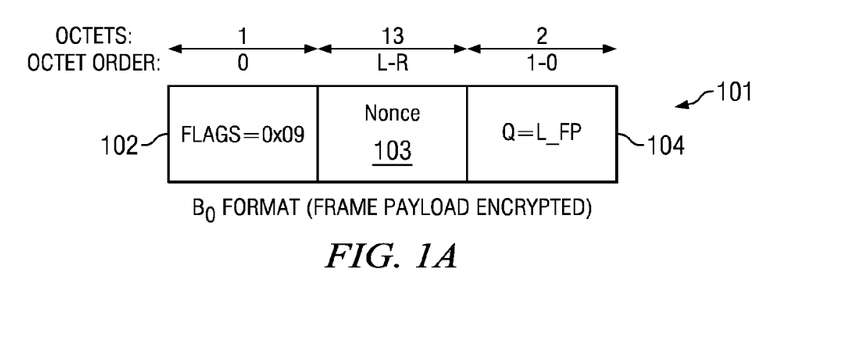
FIG. 1A illustrates a block $B_0$ that is the first input block $B_0$ to a cipher block chaining (CBC) for message integrity code (MIC) computation when the frame payload is encrypted.

FIG. 1A illustrates an initial block $B_0$ 101 that is the first input block applied to a cipher block chaining (CBC) for message integrity code (MIC) computation when the frame payload is encrypted. Block $B_0$ 101 is a sixteen-octet field comprising flags field 102, nonce field 103, and Q parameter 104 and is encoded with the octet containing the most-significant bits on the left and the octet containing the least-significant bits on the right. Flags field 102 may define, for example, whether the message is authenticated and/or encrypted, the octet length of the MIC (parameter t in NIST Special Publication 800-38C), and the octet length of the binary representation of the frame payload octet length. Nonce 103 is defined, for example, as discussed below in connection with FIG. 4. Parameter Q is the octet length of the frame payload (L_FP).

Figure 1B:
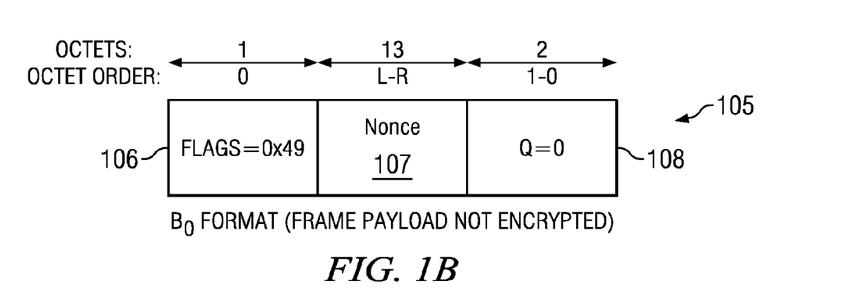
FIG. 1B illustrates a block $B_0$ that is used when the frame payload is not encrypted.

FIG. 1B illustrates an initial block $B_0$ 105 that is used when the frame payload is not encrypted. Block $B_0$ 105 is a sixteen-octet field comprising flags field 106, nonce 107, which is formed as described below for FIG. 4, and Q parameter 108, which is set to zero when the payload is not encrypted.

Figure 2A:
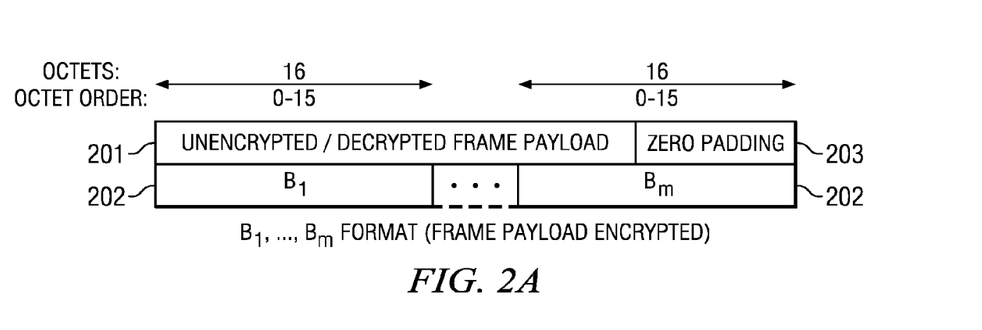
FIG. 2A illustrates an exemplary format for constructing payload blocks for use in a message authentication and encryption process when the frame payload is encrypted.

FIG. 2A illustrates an exemplary format for constructing payload blocks for use in a message authentication and encryption process when the frame payload is encrypted. The frame payload is divided into blocks to be input to the authentication and encryption/decryption process for MIC and cipher text computation and plain text recovery. Decrypted frame payload 201 is divided into a plurality of payload blocks $B_1, \ldots, B_m$ (202). Each block $B_i$ 202 is a sixteen-octet field and is encoded with the octet containing the most-significant bits on the left and the octet containing the least-significant bits on the right. Zero padding 203 is added to payload data 201 if the frame payload is not an integral multiple of sixteen octets. Accordingly, the last block $B_m$ contains no zero-padded octets if the frame payload was evenly divisible by sixteen, or contains one or more zero-padded octets on the right end if the frame payload was not evenly divisible by sixteen.

Figure 2B:
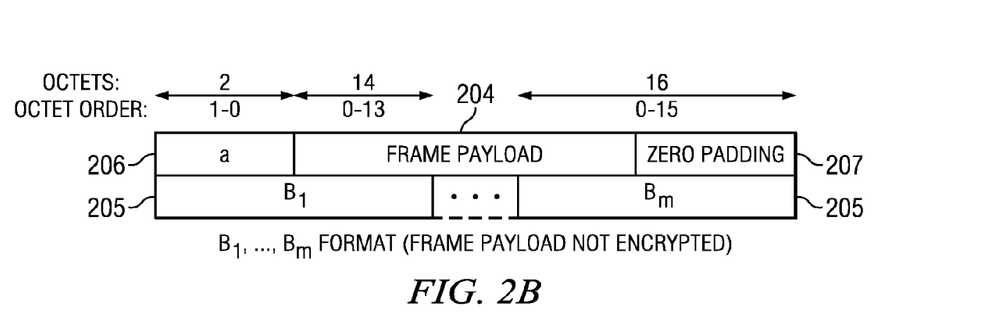
FIG. 2B illustrates an exemplary format for constructing payload blocks when the frame payload is not encrypted.

FIG. 2B illustrates an exemplary format for constructing payload blocks for a frame payload that is not encrypted. Frame payload 204 is first prepended with field 206 and then divided into sixteen-octet blocks $B_1, \ldots, B_m$ (205). The value of a in field 206 corresponds to the octet-length of the frame payload. Zero padding 207 is also added as needed to create a last block $B_m$ of sixteen octets in the same manner as describe above with respect to blocks 202 in FIG. 2A.

Figure 3:
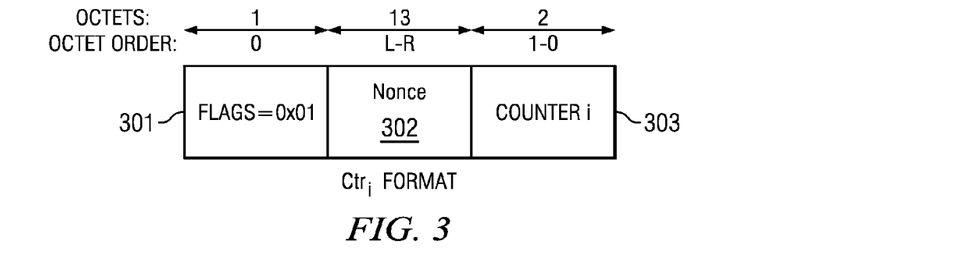
FIG. 3 illustrates counter blocks that are used for inputs to a cipher block chaining MIC computation and to a counter mode encryption.

FIG. 3 illustrates an exemplary format for counter blocks $Ctr_i$ that are used for inputs to a cipher block chaining MIC computation and to a counter mode encryption. Block $Ctr_0$ is the input block to the counter mode encryption of the cipher block chaining (CBC) output for MIC computation. Blocks $Ctr_1, \ldots, Ctr_m$ are the input blocks to the counter mode encryption/decryption if the frame payload is to be encrypted/decrypted. Blocks $Ctr_1, \ldots, Ctr_m$ are a sixteen-octet field that is encoded with the octet containing the most-significant bits on the left and the octet containing the least-significant bits on the right. Counter block $Ctr_i$ comprises flags field 301, which may have a fixed value 0x01 in one embodiment. Nonce field 302 is computed as described below with respect to FIG. 4. Counter i field 303 is incremented for the values $i=0, \ldots, m$.

Figure 4:
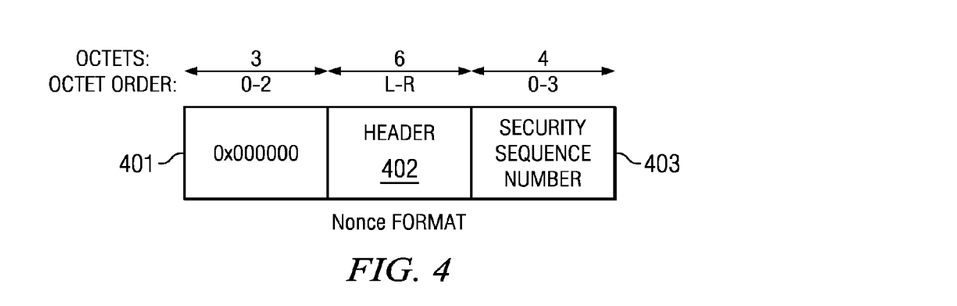
FIG. 4 illustrates an exemplary format for constructing a nonce used in a message authentication and encryption/decryption process.

FIG. 4 illustrates an exemplary format for constructing a nonce used in a message authentication and encryption/decryption process. The nonce illustrated in FIG. 4 is used, for example, in nonce fields 103 and 107 of input blocks $B_0$ in FIGS. 1A and 1B and in field 302 of counter block $Ctr_i$ in FIG. 3. The nonce is a thirteen-octet field that is used in each instance of CCM message authentication and encryption/decryption. The nonce comprises leading zeros 401, header 402, and security sequence number (SSN) 403.

Figure 8A:
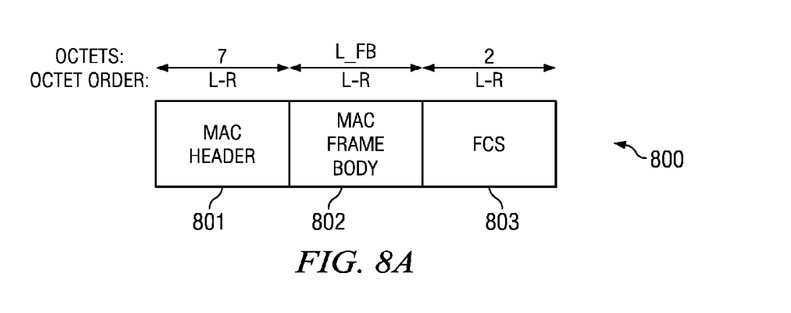
FIG. 8A illustrates an exemplary format for a frame format.
Figure 8B:
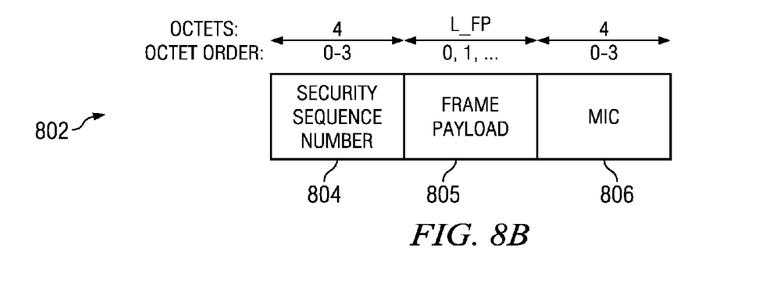
FIG. 8B illustrates an exemplary format for a frame body.

Header field 402 comprises medium access control (MAC) frame header information, such as the address for the sender and recipient of the frame and frame control data. Header field 402 may be populated using data from MAC header field 801 in frame 800 as described below (FIG. 8A). SSN field 403 may be populated using data from security sequence number field 804 from frame body 802 as described below (FIG. 8B). In one embodiment, the security sequence number field 403 is set as follows for nonce construction and replay detection. For frames secured with a new pairwise temporal key (PTK), SSN field 403 is set to 1. For frames secured with a used PTK, whether transmitted for the first time or as retries, the SSN field 403 is incremented by one from its value in the last transmitted frame secured with the same PTK. The value of the SSN field 403 increments in frames secured with the same PTK, rather than in frames of the same frame type or frame subtype. It increments even if the current frame transmission is a retransmission of an earlier transmission. For each secured frame, the security sequence number field 403 has the same value as the namesake field 801 contained in the frame body shown in FIG. 8.

Figure 5:
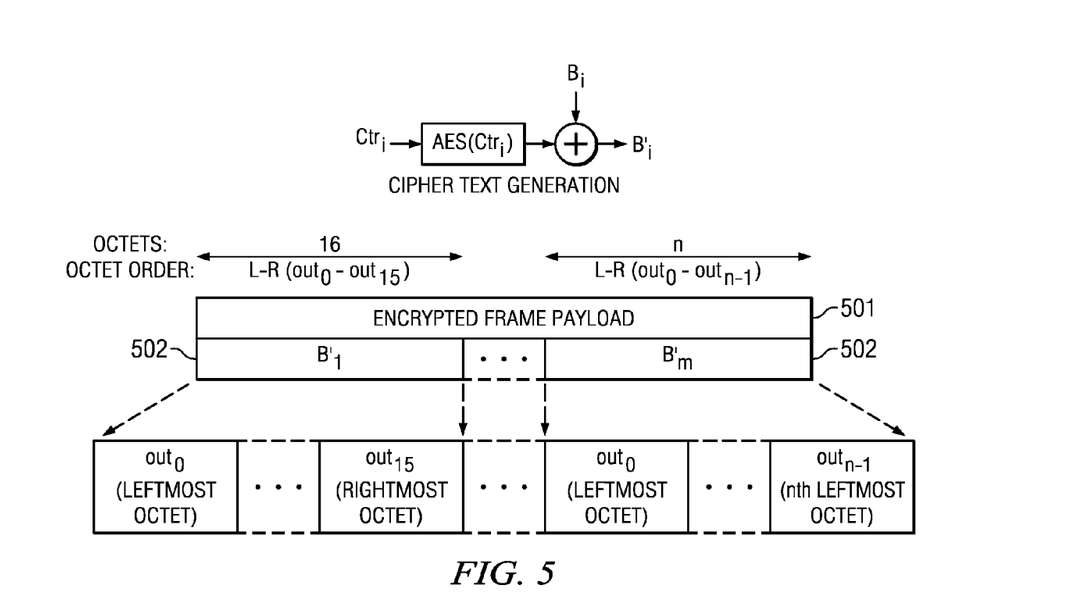
FIG. 5 illustrates a cipher text generation procedure and a format of an encrypted frame payload 501 in an encrypted frame according to one embodiment of the invention.

FIG. 5 illustrates a cipher text generation procedure and a format of an encrypted frame payload 501 in an encrypted frame according to one embodiment of the invention. Blocks B' 502 for the encrypted frame payload are computed with the payload blocks B and counter blocks Ctr formatted earlier as follows:

$$B'_i = Bi \oplus AES(Ctr_i), i=1, \ldots, m-1 \quad (1)$$

$$B'_m = L\_n(B_m) \oplus L\_n(AES(Ctr_m)) \quad (2)$$

Here, the symbol ⊕ denotes a bitwise exclusive-OR operation, and L_n(B) designates the n leftmost octets of B. AES(Ctr$_i$) represents the output of the forward cipher function of the AES block cipher algorithm applied to the counter block Ctr$_i$ under the AES key PTK used to secure the frame. The encrypted frame payload has the same length as the unencrypted frame payload, so that $n \leq 16$ is the number of octets in B$_m$ excluding zero padding octets, if any. Each encrypted block is ordered for transmission from its first octet on the left to its last octet on the right. The octet notations out$_0$, ..., out$_{15}$ correspond to those used for AES output block formation specified in FIPS Pub 197.

Figure 6:
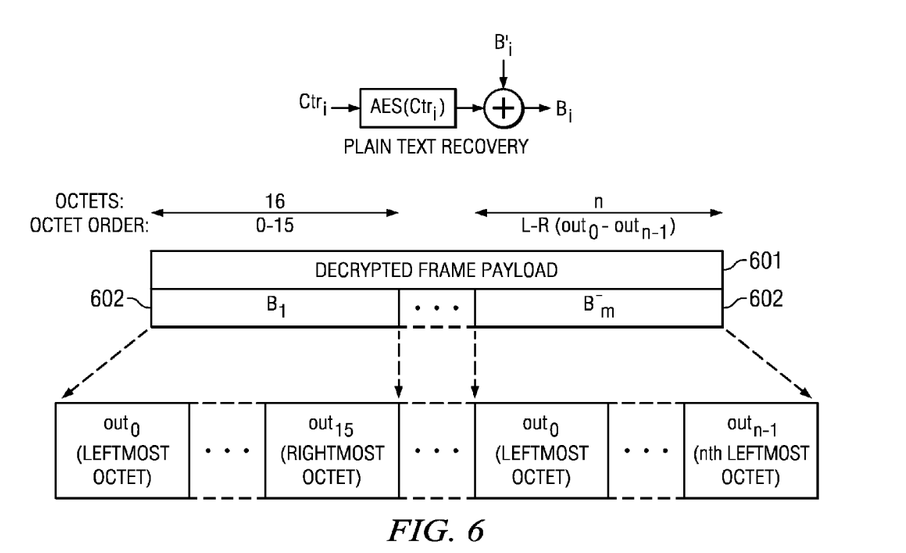
FIG. 6 illustrates a plain text recovery procedure and a format of a decrypted frame payload 601 in an encrypted frame according to one embodiment of the invention.

FIG. 6 illustrates a plain text recovery procedure and a format of a decrypted frame payload 601 in an encrypted frame according to one embodiment of the invention. Plain text payload blocks B are decrypted from the encrypted frame payload using the following equations:

$$B_i = B'_i \oplus AES(Ctr_i), i=1, \ldots, m-1 \quad (3)$$

$$B^-_m = B'_m \oplus L\_n(AES(Ctr_m)) \quad (4)$$

The decrypted frame payload 601 has the same length as the encrypted frame payload, so that the number of octets in the last block B'$_m$ of the received encrypted frame payload is $n \leq 16$. The last decrypted block B$^-_m$ is padded with 16−n zero octets at the right end to form the last block B$_m$ for MIC calculation over the received frame as described below.

Each decrypted block is ordered for MIC calculation from its first octet on the left to its last octet on the right. The decrypted payload is delivered to the destination client if the MIC is valid. Again the octet notations out0, ..., out15 correspond to those used for AES output block formation specified in FIPS Pub 197.

Figure 7:
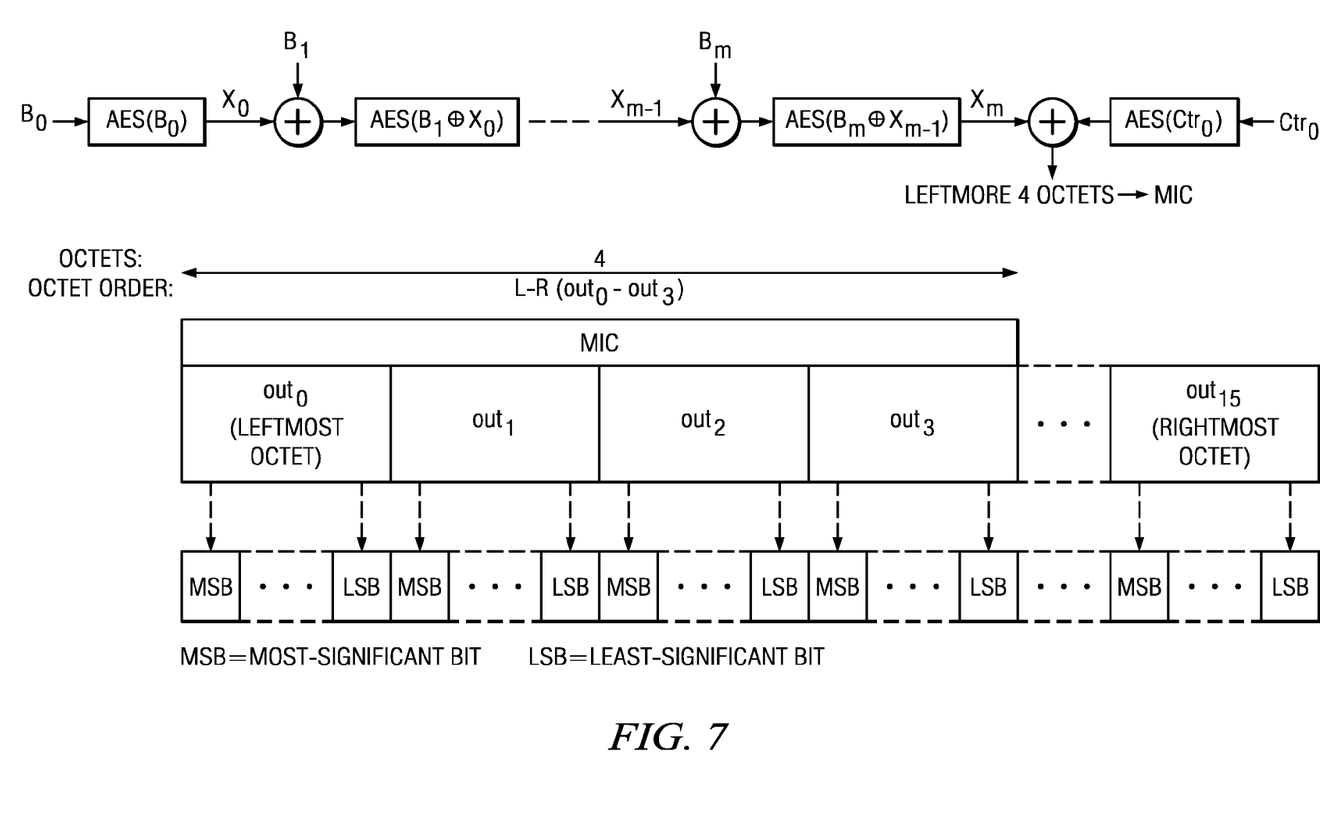
FIG. 7 illustrates a procedure for message integrity code (MIC) calculation according to one embodiment of the invention.

FIG. 7 illustrates a procedure for message integrity code (MIC) calculation according to one embodiment of the invention. The MIC for an authenticated message is calculated using the following equations:

$$MIC = LMB\_n(M), M = AES(Ctr_0) \oplus X_m \quad (5)$$

$$X_0 = AES(B_0), X_i = AES(B_i \oplus X_{i-1}), i=1, \ldots, m \quad (6)$$

The MIC is ordered for transmission from its first octet on the left to its last octet on the right. The octet notations out0, ..., out15 correspond to those used for AES output block formation specified in FIPS Pub 197. The blocks required for the MIC computation are constructed on the sender side from the unencrypted version of the frame to be transmitted and on the recipient side from the decrypted version of the received frame, if the received frame is encrypted.

FIG. 8A illustrates a MAC frame format 800 comprising a frame header 801, frame body 802, and frame check sequence (FCS) 803. The data in frame 800 is used to create the nonce, blocks B$_0$ and B$_m$ and counter Ctr$_i$ that are used to secure the frames as described above in FIGS. 1-4. Frame header 801 includes sender and recipient address information and frame control data. Frame body 802 is described in additional detail in FIG. 8B.

FIG. 8B illustrates a frame body, such as MAC frame body 802, which includes security sequence number (SSN) 804, frame payload 805, and message integrity code (MIC) 806. SSN 804 is based upon the number of prior messages transmitted using a particular pairwise temporal key (PTK) shared by the devices. SSN 804 is used for construction of the nonce described above in FIG. 4 (403). SSN 804 may also be used for replay detection. For frames secured with a new pairwise temporal key (PTK), SSN 804 is set to 1. For frames secured with a used PTK, whether transmitted for the first time or as retries, SSN 804 is incremented by 1 from its value in the last transmitted frame secured with the same PTK. The value of SSN 804 increments in frames secured with the same PTK, rather than in frames of the same frame type or frame subtype. SSN 804 increments even if the current frame transmission is a retransmission of an earlier transmission.

The frame body further includes frame payload 805 of length L_FB. The frame payload field 805 is set as follows. For data frames that are not encrypted, frame payload field 805 is set to a sequence of octets passed as a service data unit without altering the order of the sequence. For encrypted management or data frames, frame payload 805 is set to the encrypted frame payload, i.e., the cipher text of the frame payload that would otherwise be communicated in a frame not encrypted.

The MIC field 806 is set to a message integrity code (MIC) for preserving the authenticity and integrity of the header and frame body of the secured frame containing the current message, as specified above and calculated using equations (5) and (6).

Message authenticity and integrity is provided in the present invention using the message integrity code (MIC), which functions as a security check sum to protect against forged or changed data.

Message confidentiality and privacy is provided herein using message encryption, such as the AES-128 forward cipher function.

Anti-replay protection is provided herein using the MIC and the security sequence number (SSN), which allows the recipient to identify whether a received message is a new message or a repeat of a prior message. This prevents the recipient of falling victim to a malicious replay of a previous legitimate transmission.

Embodiments of the invention provide replay protection. The recipient determines if the received frame has a valid MIC value by comparing the MIC field contained in the received message frame (806) to the MIC value calculated from the received frame. If the values are equal, then the MIC is valid. The received message is treated as a replay of a previously received frame if the value of the security sequence number field (805) of the current frame meets the following conditions:

the security sequence number field value is equal to 0, if the current frame is secured by a PTK that has not been used for any previously received frames with a valid MIC field; or the security sequence number field value is equal to or smaller than SSN, if the current frame is secured by a PTK that has been used for one or more previously received frames with a valid MIC field, where SSN is the value of the security sequence number field found in the last received frame containing a valid MIC and secured by this PTK.

The recipient shall discard all detected replayed frames.

Figure 9:
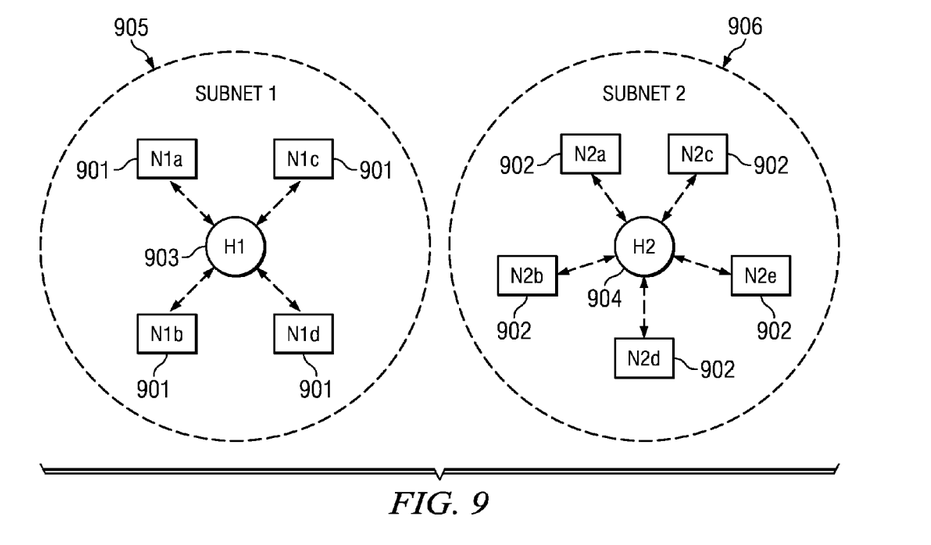
FIG. 9 is a block diagram illustrating a network topology employing embodiments of the invention.

FIG. 9 is a block diagram illustrating a network topology employing embodiments of the invention. Nodes 901, 902 and hubs 903, 904 are organized into logical sets, referred to as subnets. In the illustrated embodiment, there is only one hub in a subnet, but the number of nodes in a subnet may vary. For example, subnet 1 905 comprises hub 903 and plurality of nodes 901, and subnet 2 906 comprises hub 904 and plurality of nodes 902. In one embodiment, messages are exchanged directly between the nodes and their respective hub—i.e. within the same subnet only. In another embodiment of the invention, messages may be exchanged between different subnets. The hub and nodes may communicate using a wireless or wireline connection. An individual node and its corresponding hub may create a pairwise temporal key (PTK) which is used to encrypt and authenticate messages communicated between the node and the hub.

Figure 10:
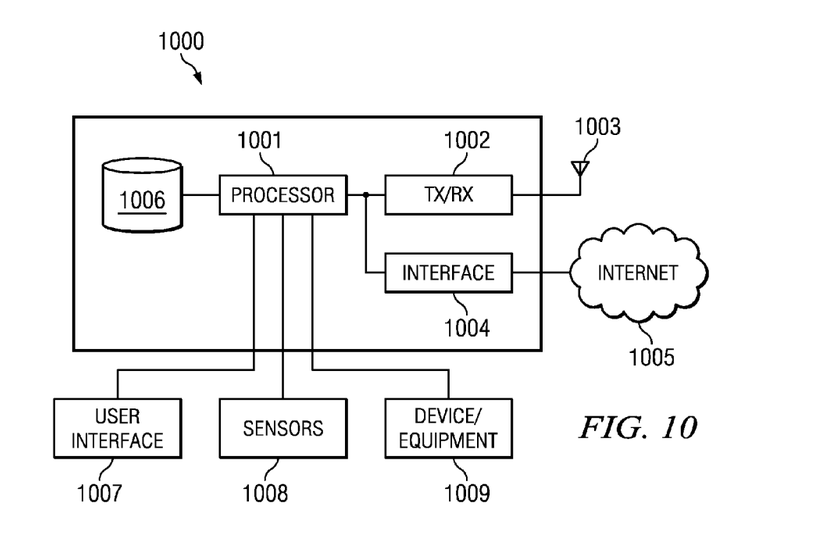
FIG. 10 is a block diagram of an exemplary embodiment of a device 1000 for providing secure communications with another device.

FIG. 10 is a block diagram of an exemplary embodiment of a device 1000 for providing secure communications with another device. Device 1000 may be used as a node 901, 902 and/or a hub 903, 904 in FIG. 9. In one embodiment, device 1000 is a hub, gateway, or controller controlling and communicating with one or more nodes. Processor 1001 processes messages to be exchanged with other nodes via transceiver 1002 and antenna 1003 and/or via wireline interface 1004 coupled to Internet or another network 1005. Processor 1001 may be a software, firmware, or hardware based device. Processor 1001 may compute or select a pairwise temporal key (PTK), message integrity code (MIC), security sequence number (SSN), or nonce, and may encrypt and decrypt messages. Processor 1001 may also generate and process messages sent to, and received from, another device in a manner that provides anti-replay protection as disclosed herein.

Memory 1006 may be used to store cryptographic data, such as a pairwise temporal key (PTK), message integrity code (MIC), security sequence number (SSN), or nonce. For such storage, memory 1006 is secured from unauthorized access. Memory 1006 may also be used to store computer program instructions, software and firmware used by processor 1001. It will be understood that memory 1006 may be any applicable storage device, such as a fixed or removable RAM, ROM, flash memory, or disc drive that is separate from or integral to processor 1001.

Device 1000 may be coupled to other devices, such as user interface 1007, sensors 1008, or other devices or equipment 1009. In one embodiment, device 1000 is a low-power wireless node operating on, in, or around a human or non-human body to serve one or more applications, such as medical connections, consumer electronics, and personal entertainment. Device 1000 may be adapted to operate in a body area network either as a node or as a hub controlling a plurality of nodes. Sensors 1008 may be used, for example, to monitor vital patient data, such as body temperature, heart rate, and respiration. Equipment 1009 may be, for example, a monitor or other device that receives and analyzes signals, such as a patient's temperature, heart rate, and respiration, from another node. Alternatively, equipment 1009 may be a device for providing a service to a patient, such as controlling an intravenous drip, respirator, or pacemaker.

When used as a node or hub in a body area network, the information transmitted or received by device 1000 is likely to include sensitive and/or confidential medical information. Accordingly, it is important to secure any session established by device 1000 to protect the messages from unauthorized parties, such as an imposter or eavesdropper. The messages transmitted or received by device 1000 may also include control signals, such as signals to control distribution of medicine or operation of a respirator or pacemaker. It is important that only authorized signals are used to control equipment 1009 and other signals be rejected or ignored to prevent, for example, unauthorized adjustments to drug distribution or respirator operation. Message communications secured with a secret session key as described herein provide the necessary level of control for such a device.

It will be understood that the subnets 905, 906 in FIG. 7 and device 1000 in FIG. 10 are presented for illustrative purposes only and are not intended to limit the scope of the systems or devices that are capable of employing the message authentication, encryption, and replay filtering procedures described herein. Any two devices in wireless or wireline communication with each other and each having a shared session key would be capable of using these procedures.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for authenticating and encrypting data for secure communications between devices, comprising:

forming a frame to be transmitted to another device, the frame comprising a frame header and a frame body, the frame body comprising a security sequence number (SSN) and a frame payload;

generating a nonce using the frame header and the SSN from the frame payload;

generating a series of counter blocks, each of the counter blocks comprising the nonce and a sequential counter value;

generating an initial input block for a cipher block chaining operation, the initial block comprising the nonce and a frame payload length value;

generating a series of payload blocks comprising equal-length sections of the frame payload; and computing a message integrity code (MIC) by cipher block chaining a cipher function applied to the initial input block, the blocks of payload data, and an initial counter block, where the cipher function uses a pairwise temporal key (PTK).

2. The method of claim 1, further comprising:

selecting a range of data from an output of the cipher block chaining operation as the MIC.

3. The method of claim 2, wherein the range of data is the four leftmost octets of the output.

4. The method of claim 1, further comprising:

computing a series of encrypted payload blocks by sequentially applying the payload blocks and corresponding counter blocks to a cipher function one pair of blocks at a time, wherein the cipher function uses the PTK.

5. The method of claim 1, further comprising:
generating an authenticated frame comprising the series of payload blocks and the MIC.

6. The method of claim 4, further comprising:
generating an authenticated and encrypted frame comprising the series of encrypted payload blocks and the MIC.

7. The method of claim 1, wherein a last payload block in the series of payload blocks is zero-padded.

8. The method of claim 1, further comprising:
forming a plurality of frames to be transmitted to another device;
repeating the generating and computing steps for each of the plurality of frames; and
wherein the SSN is sequentially incremented in each of the plurality of frames.

9. The method of claim 8, wherein the nonce for each of the plurality of frames is unique.

10. The method of claim 1, wherein the series of payload blocks further comprises a parameter indicating if the payload is encrypted.

11. The method of claim 1, wherein generating the series of payload blocks further comprises:
prepending a payload length parameter to the payload frame.

12. The method of claim 1, wherein the initial input block further comprises a parameter indicating if the frame payload is encrypted.

13. The method of claim 1, wherein the frame payload length value in the initial input block is zero if the frame payload is unencrypted.

14. A method for authenticating and decrypting received data, comprising:
receiving a frame from another device, the frame comprising a frame header and a frame body, the frame body comprising a security sequence number (SSN), a frame payload, and a first message integrity code (MIC);
generating a nonce using the received frame header and the SSN from the received frame payload;
generating a series of counter blocks, each of the counter blocks comprising the nonce and a sequential counter value;
generating an initial input block for a cipher block chaining operation, the initial block comprising the nonce and a frame payload length value;
generating a series of payload blocks comprising equal-length sections of the frame payload; and
computing a second MIC by cipher block chaining a cipher function applied to the initial input block, the blocks of payload data, and an initial counter block, where the cipher function uses a pairwise temporal key (PTK).

15. The method of claim 14, further comprising:
verifying that the first MIC matches the second MIC.

16. The method of claim 14, further comprising:
comparing the SSN to a previously recorded SSN.

17. The method of claim 16, further comprising:
discarding the received frame if the SSN is smaller than or equal to a previously recorded SSN.

18. The method of claim 14, wherein the blocks of payload data comprise decrypted payload data.

19. The method of claim 14, further comprising:
selecting a range of data from an output of the cipher block chaining operation as the second MIC.

20. The method of claim 14, further comprising:
computing a series of decrypted payload blocks by sequentially applying the payload blocks and corresponding counter blocks to a cipher function one pair of blocks at a time, wherein the cipher function uses the PTK.

21. The method of claim 20, further comprising:
identifying a payload length parameter in a first decrypted payload block.

22. A device, comprising:
a circuit for sending signals to and receiving signals from another device;
a memory for storing a shared pairwise temporal key (PTK) and messages transmitted to and received from another device; and
a processor adapted to perform operations on the signals to be transmitted to the other device, the processor operating to:
generate a frame to be transmitted to the other device, the frame comprising a frame header and a frame body, the frame body comprising a security sequence number (SSN) and a frame payload;
generate a nonce using the frame header and the SSN from the frame payload;
generate a series of counter blocks, each of the counter blocks comprising the nonce and a sequential counter value;
generate an initial input block for a cipher block chaining operation, the initial block comprising the nonce and a frame payload length value;
generate a series of payload blocks comprising equal-length sections of the frame payload; and
compute a message integrity code (MIC) by cipher block chaining a cipher function applied to the initial input block, the blocks of payload data, and an initial counter block, where the cipher function uses a pairwise temporal key (PTK).

23. The device of claim 22, the processor further adapted to select a range of data from an output of the cipher block chaining operation as the MIC.

24. The device of claim 22, the processor further adapted to compute a series of encrypted payload blocks by sequentially applying the payload blocks and corresponding counter blocks to a cipher function one pair of blocks at a time, wherein the cipher function uses the PTK.

25. The device of claim 22, the processor further adapted to generate an authenticated frame comprising the series of payload blocks and the MIC.

26. The device of claim 22, the processor further adapted to generate an authenticated and encrypted frame comprising the series of encrypted payload blocks and the MIC.

27. The device of claim 22, the processor further adapted to generate a plurality of frames to be transmitted to another device;
repeat the generating and computing steps for each of the plurality of frames; and
wherein the SSN is sequentially incremented in each of the plurality of frames.

28. The device of claim 22, the processor further adapted to prepend a payload length parameter to the frame payload.

29. A device, comprising:
a circuit for sending signals to and receiving signals from another device;
a memory for storing a shared pairwise temporal key (PTK) and messages transmitted to and received from another device; and
a processor adapted to perform operations on the signals received from the other device, the processor operating to:
receive a frame from another device, the frame comprising a frame header and a frame body, the frame body comprising a security sequence number (SSN), a frame payload, and a first message integrity code (MIC);

generate a nonce using the received frame header and the SSN from the received frame payload;

generate a series of counter blocks, each of the counter blocks comprising the nonce and a sequential counter value;

generate an initial input block for a cipher block chaining operation, the initial block comprising the nonce and a frame payload length value;

generate a series of payload blocks comprising equal-length sections of the frame payload; and compute a second MIC by cipher block chaining a cipher function applied to the initial input block, the blocks of payload data and an initial counter block where the cipher function uses a pairwise temporal key (PTK).

30. The device of claim 29, the processor further adapted to verify that the first MIC matches the second MIC.

31. The device of claim 29, the processor further adapted to compare the SSN to a previously recorded SSN.

32. The device of claim 31, the processor further adapted to discarding the received frame if the SSN matches a previously recorded SSN.

33. The device of claim 29, the processor further adapted to compute a series of decrypted payload blocks by sequentially applying the payload blocks and corresponding counter blocks to a cipher function one pair of blocks at a time, wherein the cipher function uses the PTK.

* * * * *